No. 648,111. Patented Apr. 24, 1900.
M. NILSSON.
CENTRIFUGAL CREAM SEPARATOR.
(Application filed Nov. 28, 1899.)

(No Model.) 2 Sheets—Sheet 2.

WITNESSES:
Ella L. Giles
[signature]

INVENTOR
Magnus Nilsson
BY Richards & Co.
ATTORNEYS

THE NORRIS PETERS CO., PHOTO-LITHO., WASHINGTON, D. C.

UNITED STATES PATENT OFFICE.

MAGNUS NILSSON, OF OSTRA SKRAFLINGE, HOHOG, SWEDEN.

CENTRIFUGAL CREAM-SEPARATOR.

SPECIFICATION forming part of Letters Patent No. 648,111, dated April 24, 1900.

Application filed November 28, 1899. Serial No. 738,553. (No model.)

*To all whom it may concern:*

Be it known that I, MAGNUS NILSSON, dairyman, of Ostra Skraflinge, Hohog, in the Kingdom of Sweden, have invented certain new and useful Improvements in Centrifugal Cream-Separators; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to a centrifugal cream-separator. The rotating bowl or vessel in which the separation is effected consists of white glass or other transparent material, so that the bowl can be very easily cleaned, and, moreover, the whole skimming process can be observed during the working.

Figure 1:
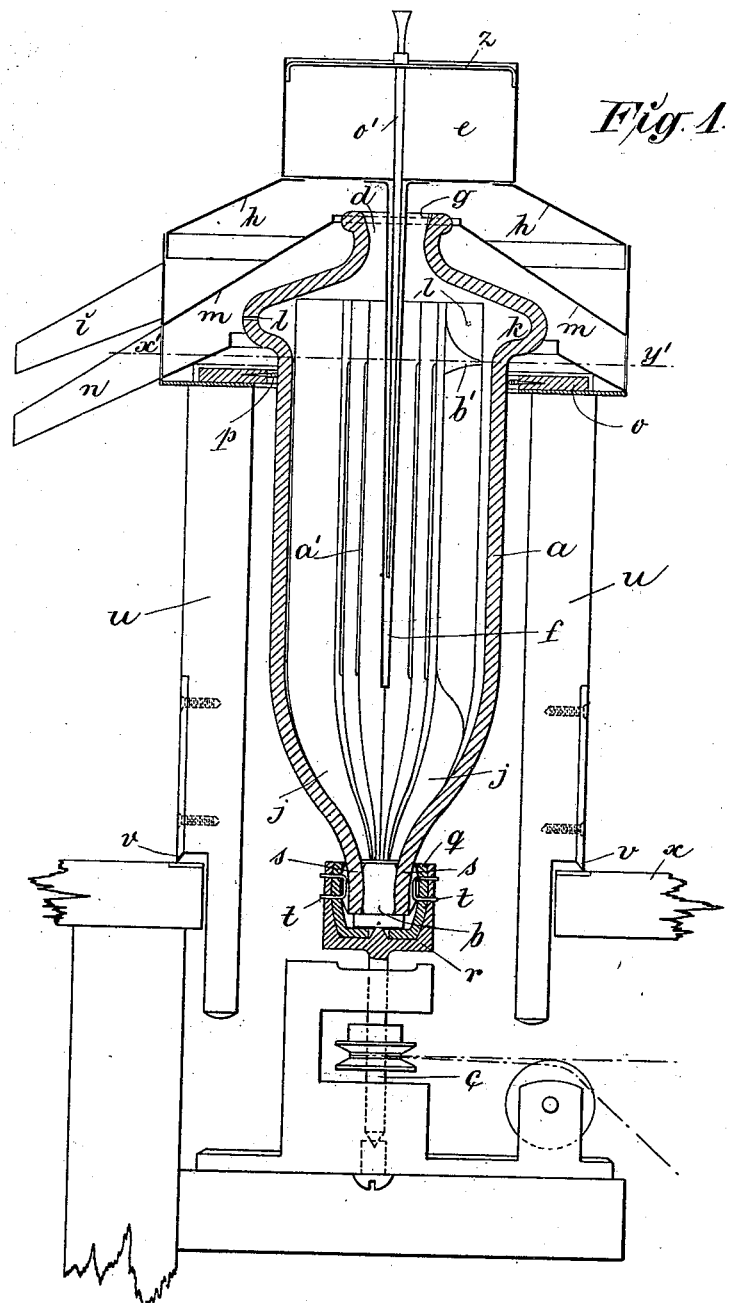
Figure 2:
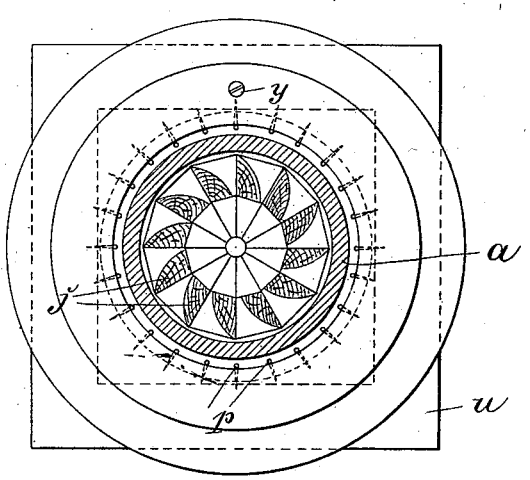
Figure 3:
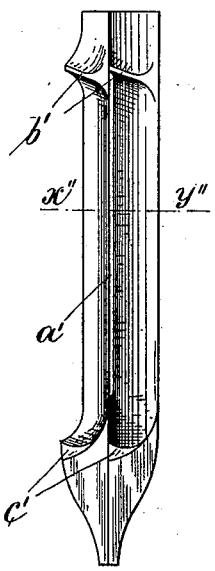
Figures 4, 5:
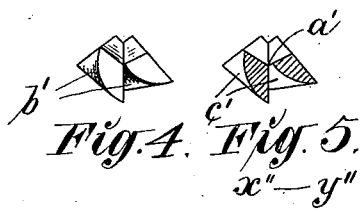

Figure 1 of the annexed drawings shows the apparatus in vertical section, and Fig. 2 in horizontal section, along the line $x'$ $y'$ in Fig. 1. Fig. 3 is a detail elevation of two of the ribs used in the cream-receptacle. Fig. 4 is a plan view of Fig. 3, and Fig. 5 is a horizontal section on line $x''$ $y''$ of Fig. 3.

The drum or bowl $a$ consists of white glass and is open at both ends. The lower opening is closed, when the separation is to be effected, by means of a stopper $b$, which with its lower side rests on a point projecting from the driving-shaft $c$, on which the whole weight of the bowl rests. Through the upper opening $d$ of the drum or bowl the whole milk is introduced from a receiver $e$ through a pipe $f$, passing from this latter to the lower part of the drum or bowl. Through the said opening $d$ the separated cream is also let out, which is facilitated by a small notch $g$ in the neck of the drum or bowl. From here the cream passes out into the cream-cover $h$ and then to the cream-outlet pipe $i$. Along the inner side of the bowl there are placed close to each other a number of ribs $j$, with the cross-section shown in Figs. 2 and 5. According to these figures the ribs are provided with sharp edges on the outside and are somewhat rounded on the one side, and between two adjacent ribs and the wall of the bowl there is a chamber triangular in horizontal section. The milk entering through the pipe $f$ in the center of the drum or bowl $a$ can enter the said chambers between the ribs, because between the inner edges there are narrow openings, formed by cutting away part of the inner edge at each rib, as is more clearly illustrated by Figs. 1, 3, and 5. The ribs being substantially triangular in cross-section at the points $b'$ $c'$ are maintained in place by resting against each other at these parts and no special fastening is required. The described device increases in a high degree the skimming capacity of the apparatus, and to this end the narrow passages $a'$ for the milk formed between the ribs especially contribute, as does also the radial position of the ribs, by which the whole-milk mass is surely set in rotation at the same time that the bowl or receptacle begins to rotate. Fig. 3 illustrates, on an enlarged scale, two ribs placed near to each other viewed from the outside. In Fig. 4 the same are shown from the top, and Fig. 5 illustrates the same in a horizontal section. They are firmly placed near to each other and are held in their right position with regard to each other by means of projections $b'$ $c'$, arranged on each of them as well at the top as at the bottom, which form the necessary support in manner shown by the drawings. When the whole milk introduced in the drum or bowl $a$ has arrived at the enlargement $k$, the process of separation is already completed, whereupon the skimmed milk is thrown out through three small radial openings $l$, cut in the largest part of the drum or bowl, to the skim-milk cover $m$ and the discharge-pipe $n$. The cream rises, as before said, through the opening $d$.

Just below the enlarged part of the drum or bowl there is arranged an india-rubber ring $o$, in the inner edge of which small pins or needles $p$ are radially introduced, with the view of supporting the bowl during the putting in motion before the same could balance itself. The lower part of the bowl is surrounded by a soft india-rubber ring $q$, secured within the upper hollow end $r$ of the driving-shaft. On two opposite sides of the lower end of the bowl there are on the outside two vertical grooves, in which staple-like parts $t$ fit. These staples are introduced through two openings in the india-rubber ring and the cup $r$, corresponding to each other. The drum or bowl is surrounded by the support $u$ in the form of a casing, which with two opposite points $v$ rests on the table $x$. When the apparatus is put in motion, the same can consequently oscillate around these two points. In other words, the support $u$, with the receptacle, can oscillate to the front and rear side of the machine, considering Fig. 1 to be a view looking from the front. In order to be movable also in a direction transversal to this one, the india-rubber ring $o$ is secured to the support by means of a screw $y$, situated, as shown in the plan view, at an angle of ninety degrees to the line drawn through the points $v$ in such a way that the rubber ring, with the receptacle, can turn around this screw to a slight degree. By this arrangement the receptacle $a$, while supported at both its upper and lower ends, has a certain amount of freedom, which will permit it to balance itself. The yielding support comprising the rubber ring $q$ at the receptacle will permit this to be done, as will also the yielding connection at the upper end of the receptacle acting in connection with the oscillating supports $u$ and the pivot $y$.

Above the receiver $e$ there is an iron bar $z$ for supporting the pipe $o'$, which with its upper end stands in communication with the air. When the milk enters in the apparatus by the pipe $f$, it sucks air with it from the pipe. This air contributes to drive the cream upward and destroys the vacuum which would arise in the center of the bowl.

I claim—

1. In combination the drum, a stopper $b$ closing its lower end, a driving-shaft having a pivot on which the stopper rests, a rubber ring surrounding the lower part of the bowl, said driving-shaft having a hollow end $r$ receiving the lower part of the drum with the rubber ring, the said lower part having grooves and the parts passing through the walls of the hollow end into said grooves, substantially as described.

2. In combination, the drum, a series of ribs arranged along the inner side thereof, of substantially-triangular cross-section, said ribs having projections $b$ $c$ at their upper and lower ends respectively resting against each other and having narrow openings between them and means for introducing the milk to the center of the drum, substantially as described.

3. In combination, the drum, having an enlarged part, a concentric rubber ring placed at a slight distance from and surrounding the drum, the pins $p$ carried by the rubber ring to bear on the drum, said ring being pivoted and a support $u$ arranged to oscillate, substantially as described.

4. In combination, the drum, the inlet-pipe for the milk and an air-pipe extending into the milk-inlet pipe and terminating at a point short of the lower end of said inlet-pipe, the said air-pipe being open at both ends and communicating at its upper end with the outside air whereby the inflowing milk will suck air in through said pipe, substantially as described.

In testimony that I claim the foregoing as my invention I have signed my name in presence of two subscribing witnesses.

MAGNUS NILSSON.

Witnesses:
N. GUSTTBERG,
A. W. ANDERSON.